United States Patent
Edwards et al.

(10) Patent No.: US 7,520,085 B2
(45) Date of Patent: Apr. 21, 2009

(54) FISHING LURE

(76) Inventors: James-Michael C. Edwards, 610 Greenwood Ave., Michigan City, IN (US) 46360; Sue Ann Edwards, 610 Greenwood Ave., Michigan City, IN (US) 46360

( * ) Notice: Subject to any disclaimer, the term of this patent is extended or adjusted under 35 U.S.C. 154(b) by 0 days.

(21) Appl. No.: 11/276,904

(22) Filed: Mar. 17, 2006

(65) Prior Publication Data

US 2006/0207160 A1 Sep. 21, 2006

Related U.S. Application Data

(60) Provisional application No. 60/594,222, filed on Mar. 21, 2005.

(51) Int. Cl.
*A01K 85/01* (2006.01)

(52) U.S. Cl. ...................... 43/17.6; 43/42.48

(58) Field of Classification Search ................ 43/17.6, 43/17.5, 42.06, 42.48
See application file for complete search history.

(56) References Cited

U.S. PATENT DOCUMENTS

| | | | | | |
|---|---|---|---|---|---|
| 1,079,891 | A | * | 11/1913 | Simms | 43/17.6 |
| 1,390,458 | A | * | 9/1921 | Moree | 43/42.48 |
| 1,422,841 | A | * | 7/1922 | Dey | 43/17.6 |
| 1,900,339 | A | * | 3/1933 | Billington | 43/17.6 |
| 1,999,522 | A | * | 4/1935 | Van Houten | 43/42.06 |
| 2,467,244 | A | * | 4/1949 | Van Hee et al. | 43/42.06 |
| 2,485,087 | A | * | 10/1949 | Diamond | 43/17.5 |
| 2,528,083 | A | * | 10/1950 | Ruff | 43/17.6 |
| 2,691,839 | A | * | 10/1954 | Duerig | 43/17.6 |
| 2,711,044 | A | * | 6/1955 | Woods | 43/17.6 |
| 2,740,220 | A | * | 4/1956 | Caplan | 43/17.6 |
| 2,752,721 | A | * | 7/1956 | Denny | 43/42.33 |
| 3,077,046 | A | * | 2/1963 | Murray | 43/17.6 |
| 3,708,903 | A | * | 1/1973 | Bercz et al. | 43/17.6 |
| 3,762,092 | A | * | 10/1973 | Bercz et al. | 43/17.6 |
| 3,828,177 | A | * | 8/1974 | Day | 43/17.6 |
| 3,940,868 | A | * | 3/1976 | Northcutt | 43/17.6 |
| 3,969,839 | A | * | 7/1976 | Ziegler | 43/17.6 |
| 4,250,650 | A | * | 2/1981 | Fima | 43/17.6 |
| 4,347,681 | A | * | 9/1982 | Fima | 43/17.6 |

(Continued)

FOREIGN PATENT DOCUMENTS

CA 2290903 A1 * 5/2001

(Continued)

*Primary Examiner*—Darren W Ark
(74) *Attorney, Agent, or Firm*—Hartman & Hartman, P.C.; Gary M. Hartman; Domenica N. S. Hartman

(57) ABSTRACT

A fishing lure that uses light as an attractant but does not require any power-generating means or light-generating means. The lure has a body with a forward end and an oppositely-disposed tail end, with the body being configured so that when drawn through water from the forward end the body orients itself to have a dorsal side, an oppositely-disposed ventral side, and two oppositely-disposed lateral sides between the dorsal and ventral sides. The lure further includes an element for collecting light impinging the dorsal side of the body, an element for conducting the light away from the dorsal side to at least one of the ventral side and the lateral sides of the body, and an element for emitting the light from the ventral and/or lateral sides of the body.

11 Claims, 2 Drawing Sheets

U.S. PATENT DOCUMENTS

| | | | | |
|---|---|---|---|---|
| 4,610,103 | A * | 9/1986 | Steinman | 43/17.6 |
| 4,700,504 | A * | 10/1987 | Mattison | 43/17.6 |
| 4,709,499 | A * | 12/1987 | Ottaviano | 43/17.6 |
| 4,727,674 | A * | 3/1988 | Garr | 43/17.6 |
| 4,741,120 | A * | 5/1988 | Cota et al. | 43/17.6 |
| 4,763,433 | A * | 8/1988 | Kulak | 43/17.6 |
| 4,799,327 | A * | 1/1989 | Treon | 43/17.6 |
| 4,800,670 | A * | 1/1989 | Mattison | 43/17.6 |
| 4,819,361 | A * | 4/1989 | Boharski | 43/17.6 |
| 4,823,497 | A * | 4/1989 | Pierce | 43/17.6 |
| 4,827,655 | A * | 5/1989 | Reed | 43/17.5 |
| 4,839,983 | A * | 6/1989 | Pippert | 43/17.6 |
| 4,879,831 | A * | 11/1989 | Herrlich | 43/17.6 |
| 4,888,905 | A * | 12/1989 | Garr | 43/17.6 |
| 4,972,623 | A * | 11/1990 | Delricco | 43/17.6 |
| 5,063,700 | A * | 11/1991 | Kiefer et al. | 43/17.6 |
| 5,190,366 | A * | 3/1993 | World | 43/17.6 |
| 5,566,494 | A * | 10/1996 | Zimmer | 43/17.6 |
| 5,675,927 | A * | 10/1997 | Kloos | 43/17.5 |
| 5,758,450 | A * | 6/1998 | Young | 43/17.6 |
| 6,209,254 | B1 * | 4/2001 | Sylla et al. | 43/17.6 |
| 6,318,016 | B1 * | 11/2001 | Ellig | 43/17.6 |
| 6,571,506 | B1 * | 6/2003 | Hunsinger | 43/17.5 |
| 6,807,766 | B1 * | 10/2004 | Hughes et al. | 43/17.6 |
| 6,922,935 | B2 * | 8/2005 | Yu | 43/17.6 |
| 2004/0200122 | A1 * | 10/2004 | Aanenson et al. | 43/17.6 |
| 2007/0062094 | A1 * | 3/2007 | Senter et al. | 43/17.6 |

FOREIGN PATENT DOCUMENTS

| | | | |
|---|---|---|---|
| CH | 617831 A5 * | 6/1980 | |
| DE | 2757998 A1 * | 6/1979 | |
| JP | 2-84123 A * | 3/1990 | |
| JP | 3-4726 A * | 1/1991 | |
| JP | 10-113099 A * | 5/1998 | |
| JP | 10-127210 A * | 5/1998 | |
| JP | 11-220977 A * | 8/1999 | |
| JP | 2000-324981 A * | 11/2000 | |
| JP | 2001-178339 A * | 7/2001 | |
| JP | 2005-130842 A * | 5/2005 | |
| JP | 2006-87420 A * | 4/2006 | |

* cited by examiner

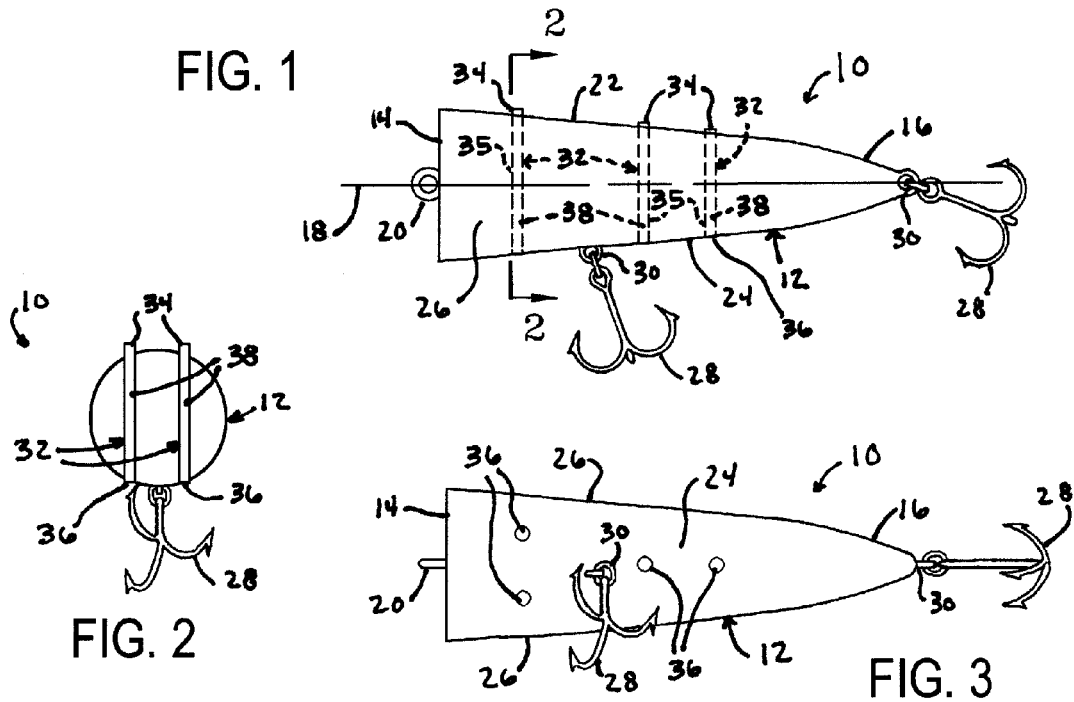
FIG. 1
FIG. 2
FIG. 3
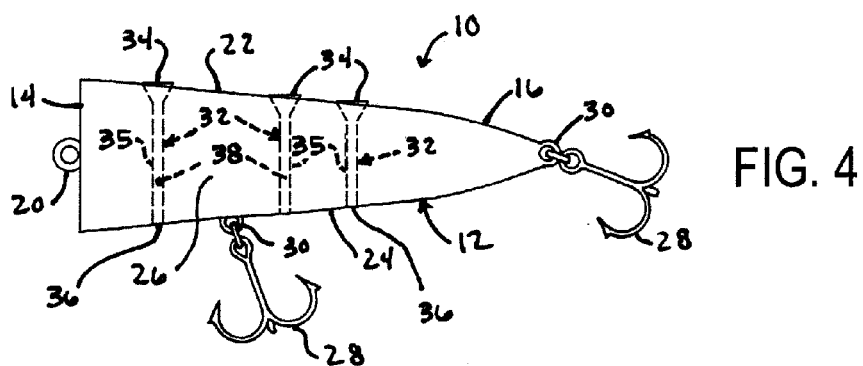
FIG. 4
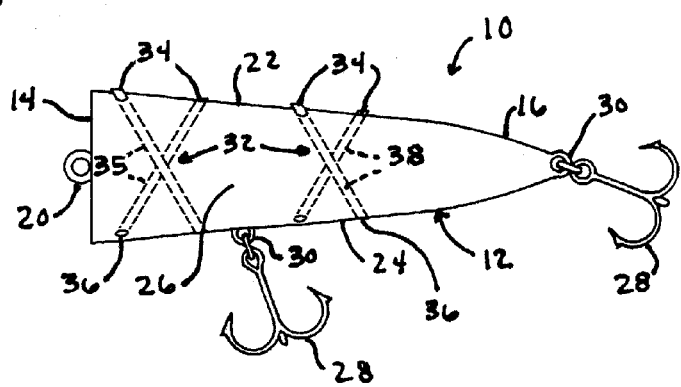
FIG. 5

FISHING LURE

CROSS REFERENCE TO RELATED APPLICATIONS

This application claims the benefit of U.S. Provisional Application No. 60/594,222, filed Mar. 21, 2005, the contents of which are incorporated herein by reference.

BACKGROUND OF THE INVENTION

The present invention generally relates to fishing equipment. More particularly, this invention relates to a fishing lure that provides one or more optical attractants without the need for a light-generating element or a power-generating device within or attached to the lure, and instead is capable of operating entirely on ambient light, such as light filtering downward from the water's surface above the lure.

Fishing lures are available in a variety of forms and styles, such as soft plastic, hard plastic, crank bait, jerk bait, top water, spinner bait, buzz bait, tube, etc. Lures are formed of opaque, transparent, and translucent materials, depending on the type of lure and its desired exterior appearance. The use of light as an attractant to draw fish to a lure is well known. General examples include lures equipped with a power source (e.g., battery) and light source (e.g., light-emitting diode, bulb, etc.), and lures containing a chemiluminescent material that produces a glow-in-the-dark effect. An example of the latter is U.S. Pat. No. 6,209,254 to Sylla et al., which discloses a replaceable chemiluminescent tube within a surface cavity in the ventral side of a lure. Shortcomings of these lures include the need to replace the light-generating components and the general lack of focus of the generated light.

The use of light pipes to conduct light through a fishing lure has also been proposed. For example, in U.S. Pat. No. 4,727,674 to Garr and U.S. Pat. No. 6,807,766 to Hughes et al., light pipes are used to conduct light from an extraneous light source, such as a light-emitting diode contained within the lure or attached to the lure. As such, these lures also suffer from the need to replace light-generating components.

BRIEF SUMMARY OF THE INVENTION

The present invention provides a fishing lure that uses light as an attractant but does not require any power-generating means or light-generating means.

The fishing lure of this invention has a body with a forward end and an oppositely-disposed tail end, with the body being configured so that when drawn through water from the forward end the body orients itself to have a dorsal side, an oppositely-disposed ventral side, and two oppositely-disposed lateral sides between the dorsal and ventral sides. The lure further includes an element for collecting light impinging the dorsal side of the body, an element for conducting the light away from the dorsal side to at least one of the ventral and lateral sides of the body, and an element for emitting the light from the ventral and/or lateral sides of the body. In a preferred embodiment, the elements for collecting, conducting, and emitting the light is in the form of one or more unitary light-conducting members, which may be rods, panels, light pipes, optical fibers, and/or optical waveguides.

In view of the above, it can be seen that a significant advantage of this invention is that light available from the surface of the body of water being fished can be the sole source of light for the fishing lure. This light, which impinges the dorsal side during use of the lure at appropriate depths below the water surface, is transmitted from the dorsal side of the lure to one or more of the other sides of the lure, i.e., the ventral and/or lateral sides of the lure. As such, there is no requirement to replace any light-generating components. Furthermore, if the light-collecting, conducting, and emitting elements have certain configurations, the emitted light can be focused and emitted in specific directions away from the body of the fish lure.

The lure of this invention can be essentially of any type, such as soft plastic, hard plastic, crank bait, jerk bait, top water, spinner bait, buzz bait, tube, etc., and fabricated from a variety of materials, including polymers, wood, glass, ceramic, etc., to have a variety of shapes, essentially any desired color or color combination, and any desired combination of hooks, feathers, eyelets, and finishing products such as eyes, glitter, decals, etc. Depending on the construction of the lure, the light-collecting, conducting, and emitting elements may be contained within an internal cavity of the lure body, or attached to the exterior of the lure. The light-collecting, conducting, and emitting elements may be in essentially any combination of quantity, size, shape, and angle relative to the body. The light-collecting, conducting, and emitting elements may also be equipped so that the emitted light can be of essentially any color.

Other objects and advantages of this invention will be better appreciated from the following detailed description.

BRIEF DESCRIPTION OF THE DRAWINGS

FIG. 1 is a side view of a fishing lure in accordance with a first embodiment of this invention.

FIG. 2 represents a cross-sectional view of the lure along section line 2-2 of FIG. 1.

FIG. 3 represents a bottom view of the lure of FIG. 1.

FIGS. 4 and 5 are side views of fishing lures in accordance with further embodiments of this invention.

DETAILED DESCRIPTION OF THE INVENTION

Figure 6:
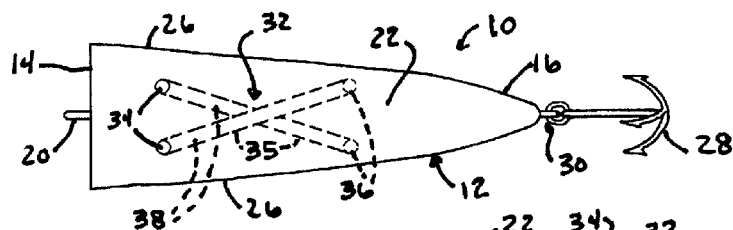
FIG. 6 is a top view of a fishing lure in accordance with another embodiment of this invention.

Illustrated in FIGS. 1 through 3 is a fishing lure 10 according to a first embodiment of the invention. The lure 10 has a body 12, preferably formed of an opaque material, formed to have an opaque surface layer, or covered with an opaque coating. For example, the body 12 may be formed entirely from wood, a soft or rigid polymer, or any other suitable material. As is generally conventional with fishing lures, the body 12 of the lure 10 has a forward end 14 and an oppositely-disposed tail end 16, which together define a longitudinal axis 18 of the body 12. An eyelet 20 is provided at the forward end 14 so that a fishing line (not shown) can be attached to the lure 10. The body 12 is preferably configured so that, when drawn through water from its forward end 14, the body 12 orients itself to have a dorsal side 22, an oppositely-disposed ventral side 24, and two oppositely-disposed lateral sides 26 between the dorsal and ventral sides 22 and 24. Orientation of the body 12 can be achieved with suitable appendages (not shown) and/or by locating at least one hook along the ventral side 24. The latter is represented in FIGS. 1 and 3, in which hooks 28 are shown as attached to eyelets 30 on the ventral side 26 of the body 12, as well as the tail end 16 of the body 12.

A plurality of light-conducting members 32 are shown as extending through the body 12 of the lure 10, so as to be oriented in a dorsal-ventral direction perpendicular to the longitudinal axis 18 of the body 12, and therefore generally vertical during use of the lure 10. The light-conducting members 32 are represented in FIGS. 1 through 3 as having a cylindrical or tubular shape, with each having a first end 34 located at and preferably protruding from the dorsal side 22 of the body 12, an opposite-disposed second end 36 located at and optionally protruding from the ventral side 24 of the body 12, and an optical passage 38 contiguous therebetween. As a result of being located at the dorsal side 22, the first end 34 of each light-conducting member 32 is operable to collect light impinging the dorsal side 22 of the lure body 12. The optical passage 38 conducts the light collected by the first end 34 to the second end 36, the latter of which emits the light as a relatively focused beam in a direction away from the body 12.

As evident from the above description, the fishing lure 10 and its operation do not require the use of any power-generating means or light-generating means within or attached to the lure 10. Instead, the light used to attract fish can be obtained solely from ambient light surrounding the lure 10, typically sunlight from the surface of the water in which the lure 10 is being used, though foreseeably from a spot light or other source of light shown onto the water surface. The depth at which the lure 10 can be used will depend on the intensity of light at the water surface, as well as the amount of sediment suspended in the water. Other factors include the color and opacity of the body 12, with darker colors and complete opacity maximizing the contrast between the lure 10 and the emitted light. Another factor is the cross-sectional area of the light-conducting members 32, with greater areas generally increasing the amount of light conducted to the ventral side 24 of the body 12. However, under appropriate conditions, it is believed that individual light-conducting members 32 with cross-sections as small as about 0.1 square millimeter should be capable of attracting fish to the lure 10.

The light-conducting members 32 can be formed from a variety of materials that are capable of conducting light with sufficient efficiency so that light collected by their first ends 34 will be focused and emitted with sufficient intensity from their second ends 36 to attract a fish to the lure 10. In practice, clear acrylic rods or sticks inserted into holes 35 drilled in the dorsal-ventral direction through the lure body 12 have been effective, though other materials and installation methods could be used. For example, light pipes, optical fibers, and other types of optical waveguide devices and materials known in the optics-related arts could be used instead of a plastic rod or stick. The light-conducting members 32 occupy the entire volume of the respective holes in which they are inserted. Furthermore, it is foreseeable that all or portions of the light-conducting members 32 could be defined by an optically reflective material applied to the walls of a hole that extends through the body 12 of the lure 10. Those skilled in the art will also appreciate that, depending on the materials and manner in which they are formed, the light-conducting members 32 can emit light of essentially any color, e.g., such as by adding pigmentation to the material used to form the members 32 or coating the walls of the members 32 or the hole or slot containing the members 32.

FIGS. 4 through 10 depict additional configurations of the lure 10 in accordance with further embodiments of this invention. In these Figures, consistent reference numbers are used to identify functionally similar structures.

The fishing lure 10 in FIG. 4 differs from the embodiment of FIGS. 1 through 3 by the first ends 34 of the light-conducting members 32 having larger cross-sectional areas than the corresponding second ends 36 of the members 32. The purpose of this configuration is to increase the amount of light that can be collected by the light-conducting members 32 at the dorsal side 22 of the body 12.

Figure 7:
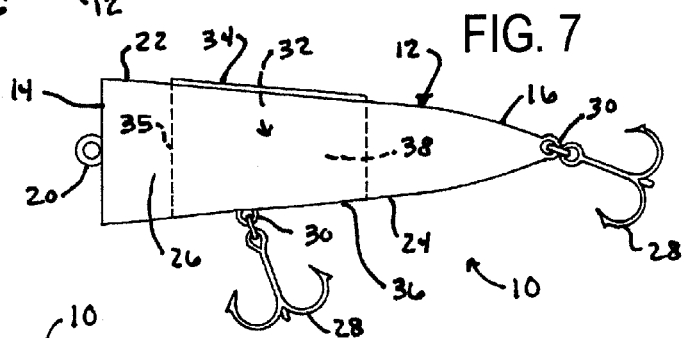
FIGS. 7 and 8 are side and bottom views, respectively, of a fishing lure in accordance with yet another embodiment of this invention.
Figure 8:
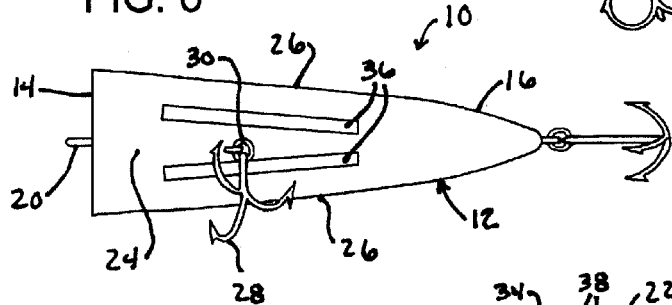
Figure 9:
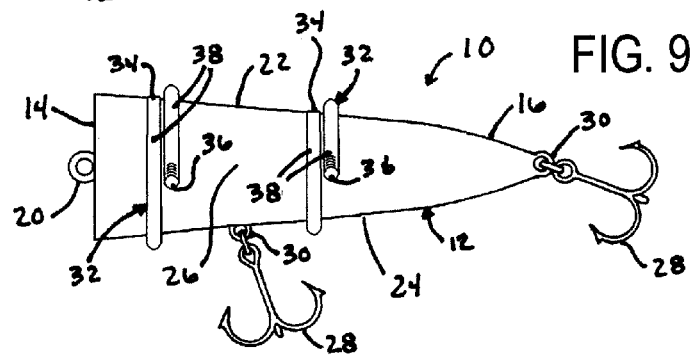
FIGS. 9 and 10 are side views of fishing lures in accordance with still other embodiments of this invention.
Figure 10:
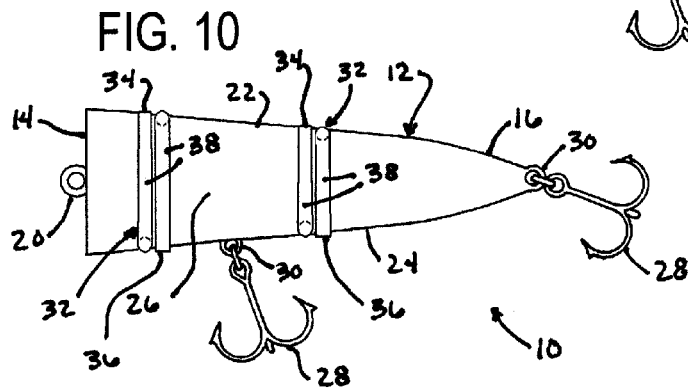

In FIGS. 5 and 6, lures 10 are shown with their light-conducting members 32 oriented so as to be transverse but not perpendicular to the longitudinal axis 18 of the body 12. The result is a side-to-side, front-to-back orientation that emits light from the lateral sides 26 near the ventral side 24, and in directions that have a lateral-forward or lateral-rearward directional components. This embodiment is believed to be particularly beneficial for lures that are worked on or near the bottom. FIGS. 7 and 8 depict a fishing lure 10 that differs as a result of using plastic panels with rectangular cross-sections for the light-conducting members 32, instead of rods or tubes with circular cross-sections as used in the previous embodiments. With each of the foregoing embodiments, the light-conducting members 32 are shown as extending through the lure body 12 and secured within (or possibly defined by) a cavity machined or otherwise formed in the body 12. In contrast, FIGS. 9 and 10 depict embodiments particularly well suited for lures whose bodies 12 are difficult to form or machine to have a hole, slot, or other type of cavity for the light-conducting members 32. In FIGS. 9 and 10, the lures 10 are shown with the light-conducting members 32 formed, wrapped or otherwise secured around the circumference of their bodies 12. In each case, the first ends 34 of the light-conducting members 32 are disposed at the dorsal side 22 of the lure body 12, with their corresponding second ends 36 disposed at either a lateral side 26 (FIG. 9) or the ventral side 24 (FIG. 10) of the body 12. In FIG. 9, the second ends 36 of the light-conducting members 32 curve away from the lure body 12 so that the light is emitted in lateral directions away from the body 12. In FIG. 10, the second ends 36 of the light-conducting members 32 terminate at the ventral side 2 so that the light is emitted in the vertical-ventral direction away from the body 12. FIG. 10 also shows the light-conducting members 32 recessed into circumferential grooves defined in the body 12 of the lure 10, so as to have minimal effect on the outline and performance of the lure 10. In the embodiments of both FIGS. 9 and 10, the light-conducting members 32 can be attached to their lure bodies 12 before painting and/or lacquering the bodies 12 so that the members 32 blend in with the remainder of the lure 12. Lacquering over the ends 34 and 36 of the members 32 is also desirable if the members 32 are hollow, so that water does not enter the members 32 and deposit sediment, etc.

While a particular type of lure 10 is represented in the Figures, lures 10 within the scope of this invention can be of a variety of types, such as soft plastic, hard plastic, crank bait, jerk bait, top water, spinner bait, buzz bait, tube, etc., and therefore have a variety of other shapes and essentially any desired color or color combination. In addition to the features shown in the Figures, lures within the scope of this invention can also be equipped with a variety of additional features, such as combinations of hooks, feathers, eyelets, and finishing products such as eyes, glitter, decals, etc.

While the invention has been described in terms of a preferred embodiment, it is apparent that other forms could be adopted by one skilled in the art. Therefore, the scope of the invention is to be limited only by the following claims.

The invention claimed is:
1. A fishing lure comprising:
a body with a forward end and an oppositely-disposed tail end, at least an external surface of the body being opaque;

means associated with the body for self-orienting the body when drawn through water from the forward end, the self-orienting means orienting the body to have a dorsal side, an oppositely-disposed ventral side, and two oppositely-disposed lateral sides between the dorsal and ventral sides, the self-orienting means comprising at least one hook attached at the ventral side;

at least one hole extending entirely through the body and having a first end at a dorsal surface defined by the dorsal side of the body and a second end at a second surface defined by the ventral side of the body; and a non-fluorescent and non-chemiluminescent light-conducting member disposed within and entirely closing the at least one hole by occupying the entire volume of the at least one hole and being operable to collect light impinging a first end of the light-conducting member at the dorsal side of the body, conduct the light away from the dorsal side to the second surface of the body, and emit the light from a second end of the light-conducting member at the ventral side, the second end of the light-conducting member being configured at the ventral side so that the emitted light from the light-conducting member is substantially a focused beam;

wherein the fishing lure does not comprise any power-generating means, any light-generating means, any light-storing means, and any fluorescent means, but instead solely emits light that has been collected and obtained solely from ambient light above the fishing lure when self-oriented by the self-orienting means, the fishing lure being configured so that, when self-oriented by the self-orienting means, substantially all of the collected and obtained ambient light enters the light-conducting member through the first end thereof at the dorsal side of the body, is reflected through the body via the light-conducting member to the second end thereof at the ventral side of the body, and is emitted from the second end and the ventral side of the body as the focused beam.

2. The fishing lure according to claim 1, wherein the at least one hole and the light-conducting member therein have cylindrical shapes.

3. The fishing lure according to claim 1, wherein the light-conducting member is chosen from the group consisting of plastic rods, plastic panels, light pipes, optical fibers, and optical waveguides.

4. The fishing lure according to claim 1, wherein the at least one hole and the light-conducting member therein are oriented so as to be perpendicular to a longitudinal axis of the body.

5. The fishing lure according to claim 1, wherein the first end of the light-conducting member protrudes from the at least one hole at the dorsal surface of the body.

6. The fishing lure according to claim 1, wherein the second end of the light-conducting member does not protrude from the at least one hole at the second surface of the body.

7. A fishing lure comprising:

an opaque body having a forward end and an oppositely-disposed tail end;

means associated with the body for self-orienting the body when drawn through water from the forward end, the self-orienting means orienting the body to have a dorsal side, an oppositely-disposed ventral side, and two oppositely-disposed lateral sides between the dorsal and ventral sides, the self-orienting means comprising at least one hook attached at the ventral side;

means for securing a fishing line to the forward end of the body;

a plurality of holes extending entirely through the body, at least a first of the holes having a first end at a dorsal surface defined by the dorsal side of the body and a second end at a ventral surface defined by the ventral side of the body;

a plurality of light-conducting members within the holes, each light-conducting member having first and second ends and an optical passage therebetween, a first of the light-conducting members being a non-fluorescent and non-chemiluminescent light-conducting member received in and entirely closing the first hole by occupying the entire volume of the first hole, the first end of the first light-conducting member being located at the dorsal side of the body and operable to collect light impinging the dorsal side, the second end of the first light-conducting member being located at the ventral side of the body so that light collected at the first end of the first light-conducting member and conducted through the optical passage of the first light-conducting member is emitted from the second end of the first light-conducting member at the ventral side, the second end of the first light-conducting member being configured at the ventral side so that the emitted light from the light-conducting member is substantially a focused beam in a direction away from the body;

wherein the fishing lure does not comprise any power-generating means, any light-generating means, any light-storing means, and any fluorescent means, but instead solely emits light that has been collected and obtained solely from ambient light above the fishing lure when self-oriented by the self-orienting means, the fishing lure being configured so that, when self-oriented by the self-orienting means, substantially all of the collected and obtained ambient light enters the light-conducting member through the first end thereof at the dorsal side of the body, is reflected through the body via the light-conducting member to the second end thereof at the ventral side of the body, and is emitted from the second end and the ventral side of the body as the focused beam.

8. The fishing lure according to claim 7, wherein the light-conducting members are chosen from the group consisting of plastic rods, plastic panels, light pipes, optical fibers, and optical waveguides.

9. The fishing lure according to claim 7, wherein the first light-conducting member is oriented so as to be perpendicular to a longitudinal axis of the body.

10. The fishing lure according to claim 7, wherein the first end of the first light-conducting member protrudes from the dorsal surface.

11. The fishing lure according to claim 7, wherein the second end of the first light-conducting member does not protrude from the ventral surface.

* * * * *